United States Patent [19]

Katagiri et al.

[11] Patent Number: 5,333,022
[45] Date of Patent: Jul. 26, 1994

[54] BATTERY HOUSING FOR A COMPACT ELECTRIC APPARATUS

[75] Inventors: Moriya Katagiri, Hachioji; Kazuhiro Satoh, Sagamihara, both of Japan

[73] Assignee: Olympus Optical Co., Ltd., Tokyo, Japan

[21] Appl. No.: 22,367

[22] Filed: Feb. 25, 1993

[30] Foreign Application Priority Data

Feb. 26, 1992 [JP] Japan ............................ 4-008799[U]

[51] Int. Cl.$^5$ ...................... G03B 17/08; G03B 17/02
[52] U.S. Cl. ........................................ 354/64; 354/288
[58] Field of Search ............... 354/64, 288; 206/333; 220/3.8; 292/4, 57, 59

[56] References Cited

U.S. PATENT DOCUMENTS

| 2,334,681 | 11/1943 | Murphy | 292/59 |
| 4,623,753 | 11/1986 | Feldman et al. | 220/3.8 |

FOREIGN PATENT DOCUMENTS

| 58-211131 | 12/1983 | Japan . | |
| 63-119282 | 8/1988 | Japan . | |
| 64-40830 | 3/1989 | Japan . | |
| 63-82195 | 10/1989 | Japan | 354/288 |

OTHER PUBLICATIONS

Albert Bopple and Helmut Ettischer, Research Disclosure, Oct. 1979, 590–592.

Primary Examiner—Michael L. Gellner
Assistant Examiner—Eddie C. Lee
Attorney, Agent, or Firm—Louis Weinstein

[57] ABSTRACT

In a battery housing for a camera of the present invention, when a rotatable rotary member included in a battery cover is engaged with projections of a battery casing formed in a camera body, the battery cover is mounted. Unlike a conventional battery cover, claw members or other members dedicated for holding a battery cover are unnecessary. Therefore, the battery housing of the present invention can be constructed with a limited number of parts. Moreover, the shapes of members employed are simple, which upgrades cost-effectiveness.

18 Claims, 7 Drawing Sheets

BATTERY HOUSING FOR A COMPACT ELECTRIC APPARATUS

BACKGROUND OF THE INVENTION

1. Field of the Invention

The present invention relates to a battery housing for compact electric apparatus, or more particularly, to a battery housing for a compact electric apparatus such as a camera.

2. Description of the Related Art

Figure 9:
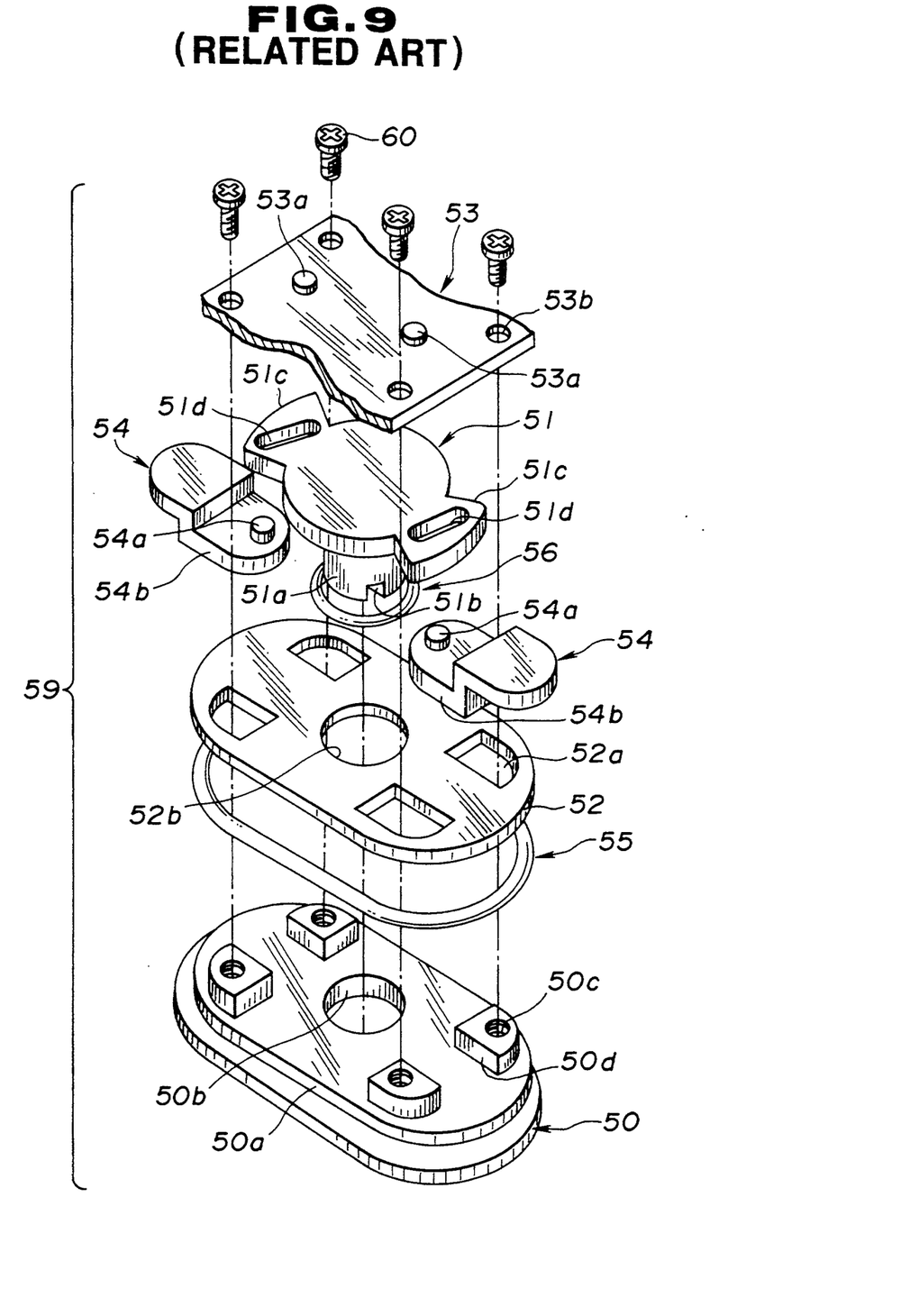
FIG. 9 is an exploded oblique view of a battery cover of a camera of a prior art.
Figure 10:
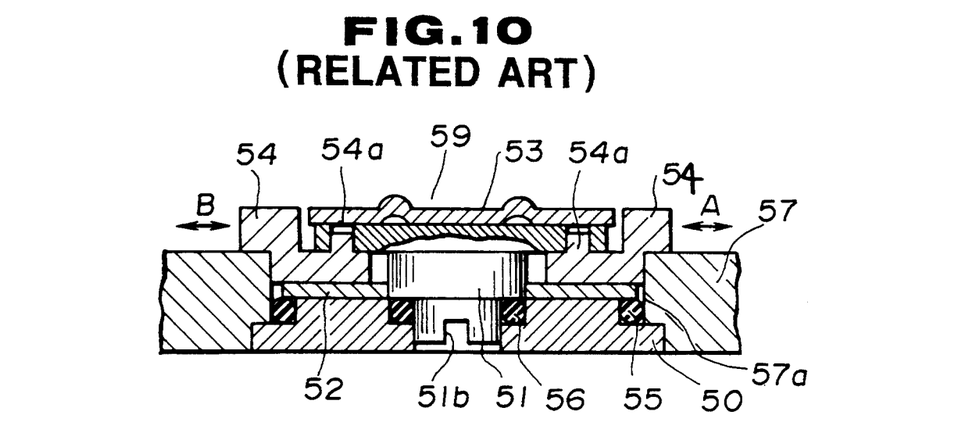
FIG. 10 is a longitudinal cross-sectional view of the battery cover of FIG. 9 in a mounted state.

Various structures have been proposed as a battery housing for a camera that is a compact electric apparatus, and put to practical use. For example, an arrangement shown in FIGS. 9 and 10 has been known as a battery housing for storing multiple batteries in a row sideways. FIG. 9 is an exploded oblique view of a battery cover 59 of a conventional battery housing. FIG. 10 shows a longitudinal cross section of the battery cover 59 in an assembled state.

The battery cover 59 is a battery cover for a waterproof camera, which consists mainly of a battery cover body 50, an O-ring presser 52, locking claws 54, a rotation drive member 51 for driving the claws 54, and a presser 53 on which battery contacts 53a are arranged.

A fluid-tight O-ring 55 for shutting out fluid from a battery insertion opening 57a (See FIG. 10) of a camera body 57 is engaged with an O-ring inserting section 50a of the battery cover body 50. The O-ring 55 is pressed with the presser 52 so as not to come off body 50. An axial cyclinder 51a of the rotation drive member 51 is fitted into a hole 50b bored in the center of the battery cover body 50 with a fluid-tight O-ring 56 attached thereto.

A plurality of seats 50c each having a guide surface 50d are formed at four corners of the battery cover body 50. The seats 50c are penetrate through holes 52a bored on the O-ring presser 52 and project upwardly. The two claws 54 are placed so that they can slide freely along the opposed guide surfaces 50d of the seats 50c of projections via sliding surfaces 54b thereof. Pins 54a formed on the claws 54 are fitted into associated grooved cams 51d dug in the rotation drive member 51 so that the pins 54a can slide freely. Then, the presser 53 holding the O-ring presser 52, claws 54, and rotation drive member 51 is fixed to the battery cover body 50 with screws 60 inserted in screw holes 53b.

The two claws 54 move in or out in the directions of arrows A and B in FIG. 10 with the movements of the pins 54a resulting from the rotation of the rotation drive member 51. When the claws 54 move out, the claws 54 cooperate with the battery cover body 50 to lock the battery cover 59 in the camera body 57.

Figure 11:
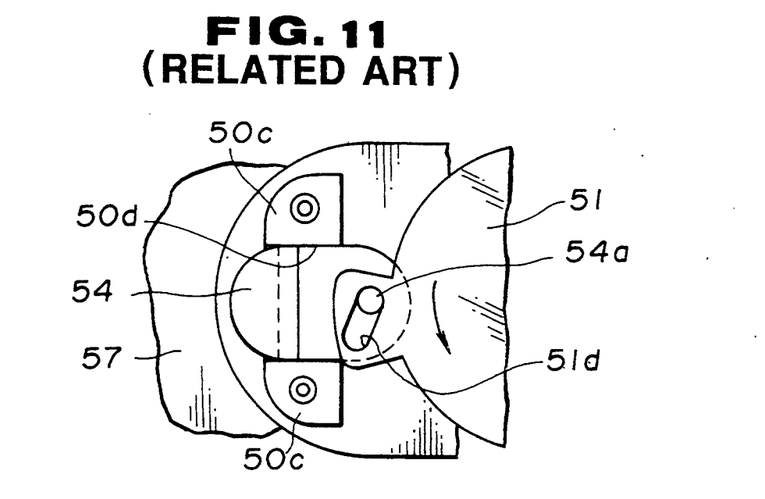
FIG. 11 shows an operating state of a presser with the battery cover of FIG. 9 dismounted.
Figure 12:
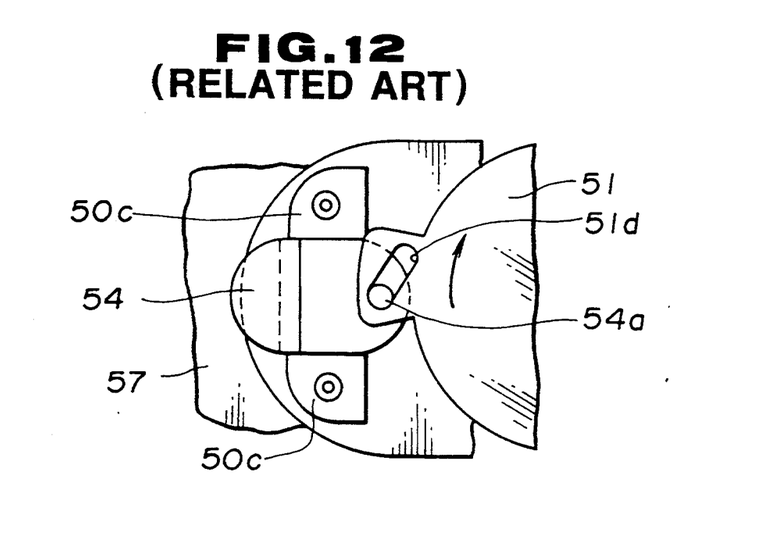
FIG. 12 shows an operating state of the presser with the battery cover of FIG. 9 mounted.

Mounting or dismounting the conventional battery cover 59 having the aforesaid construction in or from the camera body 57 will be described in conjunction with FIGS. 10 to 12. FIGS. 11 and 12 show the operating states of the battery cover 59 with the presser 53 removed. The rotation drive member 51 is rotated by turning a coin inserted in a slot 51b, which withdraws the claws 54 to an unlocked position shown in FIG. 11. After batteries are loaded in the camera body 57, the battery cover body 50 is inserted in the opening 57a.

Then, the rotation drive member 51 is rotated to project the claws 54. Then, the state shown in FIG. 10 or 12 is attained. The battery cover body 50 and claws 54 hold the camera body 57 tightly. The battery cover body 50, claws 54, and camera body 57 engage with one another, and thus the battery cover 59 is mounted (i.e. locked). To dismount the battery cover 59, the rotation drive member 51 must be rotated to withdraw the claws 54 (FIG. 11).

The foregoing conventional battery cover 59 has a capacity for locking a battery cover in a camera and a capacity for placing batteries in an electrically conducting state. However, dedicated locking claws 54 are needed. Anyhow, the number of parts is large and assembling efficiency is poor, which deteriorates cost-effectiveness.

OBJECTS AND SUMMARY OF THE INVENTION

An object of the present invention is to provide a battery housing for a compact electric apparatus that when employed for a compact electric apparatus in which multiple batteries are loaded in a row sideways, enables reduction in the number of parts, improves assembling efficiency, and upgrades cost-effectiveness.

A battery housing for a compact electric apparatus of the present invention comprises a battery casing for storing multiple batteries so that the batteries will line up in parallel with an axis in the midst thereof, and a battery cover for shielding the battery casing. The battery housing further comprises locking projections formed on the section of the battery casing for mounting the battery cover, an operating member part of which is exposed to the outside of the battery cover and that is included in the battery cover so as to be freely rotatable, and a rotary member that is included in the battery cover so as to rotate in unison with the operating member at the position facing batteries to be loaded inside the battery cover.

The rotary member Includes engagement chips that engage with the locking projections, multiple contacts that come into contact with electrodes of multiple batteries to be loaded, and a clicking member for restricting the rotation of the rotary member.

The other features and advantages of the present invention will be apparent from the description below.

DETAILED DESCRIPTION OF THE PREFERRED EMBODIMENT

The present invention will be described on the basis of an illustrated embodiment.

A battery housing for a camera, a compact electric apparatus, representing an embodiment of the present invention will be described in conjunction with FIGS. 1 and 2. The battery housing applies, for example, to a waterproof camera, comprising a battery casing formed in a camera body and a battery cover.

Figure 1:
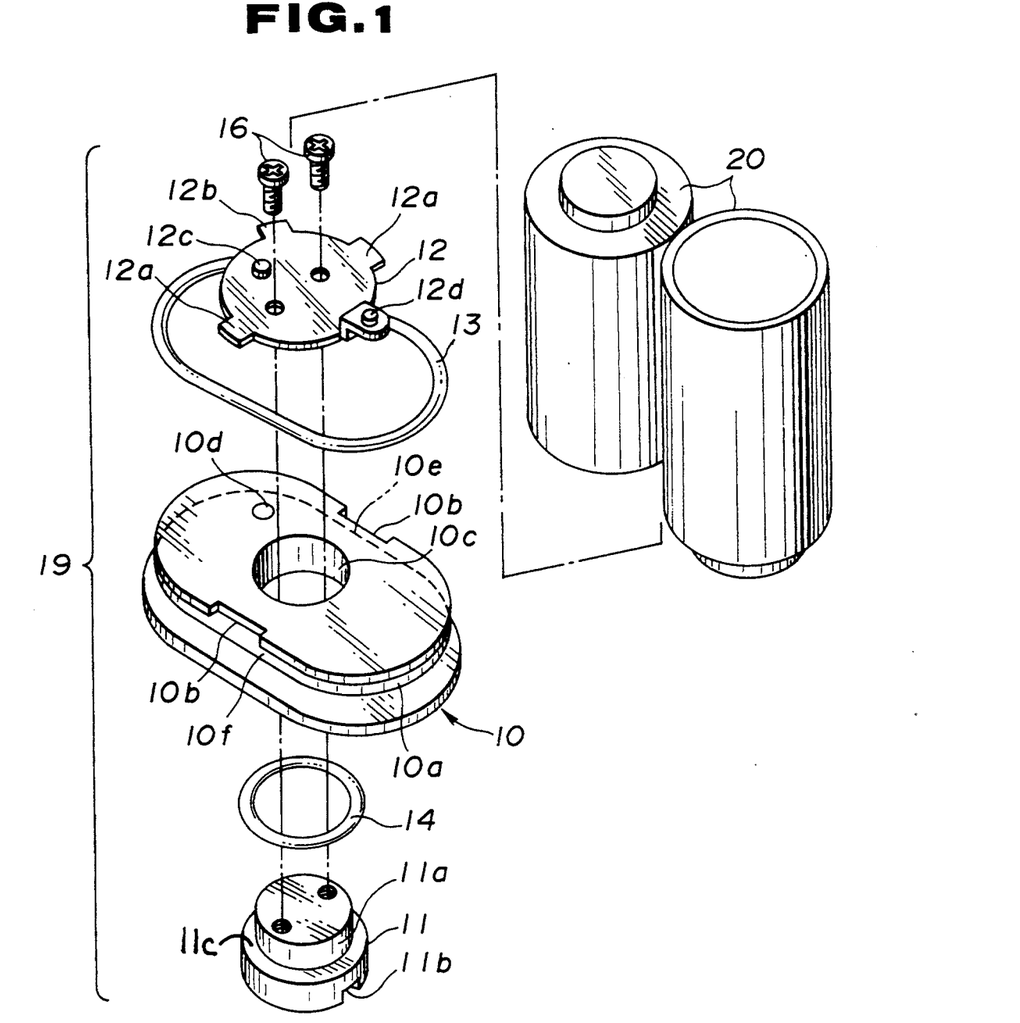
FIG. 1 is an exploded oblique view of a battery cover of a battery housing representing an embodiment of the present invention.
Figure 2:
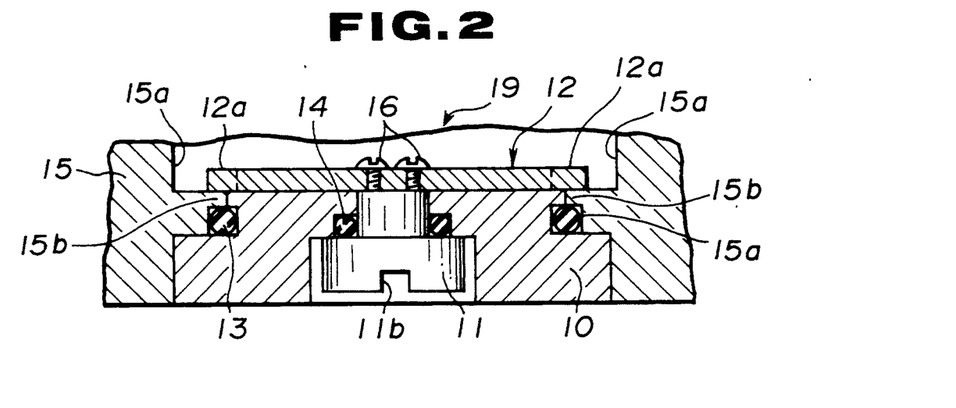
FIG. 2 is a longitudinal cross-sectional view of the battery housing of FIG. 1 in which a battery cover is mounted in a battery casing.

FIG. 1 is an exploded oblique view of a battery cover 19. FIG. 2 is a longitudinal cross-sectional view showing the battery cover 19 mounted in a battery casing formed in a camera body 15. As shown in FIGS. 1 and 2, the battery cover 19 consists mainly of a battery cover body 10 for sealing a battery insertion opening 15a of the camera body 15, an operating member 11 that has a slot 11b and is fitted into a hole 10c bored on the battery cover body 10 so as to be freely rotatable, a rotary plate 12 that is fixed to the operating member 11 with screws 16, and that serves as a connection chip including contacts 12c and 12d which can come into contact with batteries, and packings (i.e. O-rings) 13 and 14.

Figure 3:
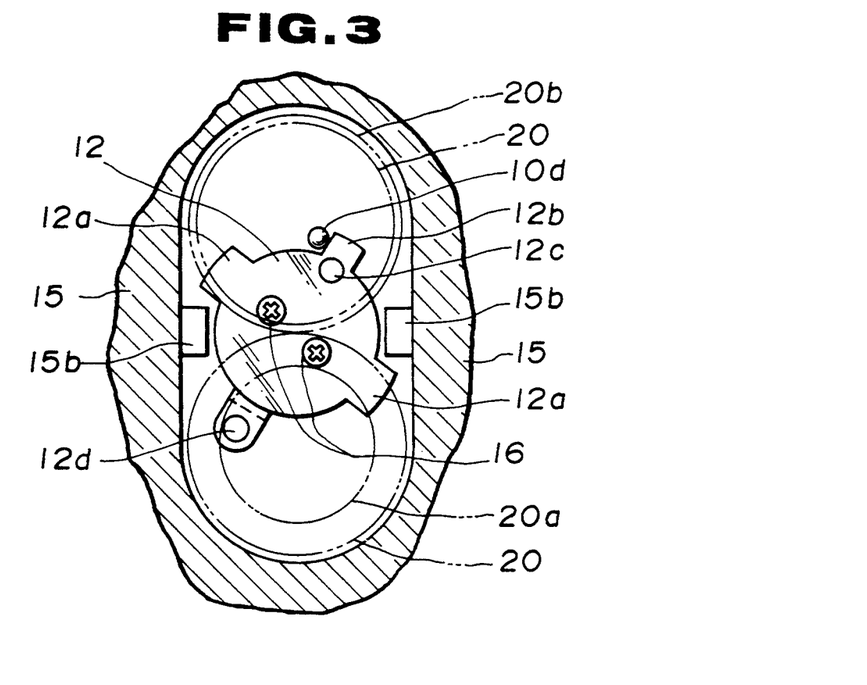
FIG. 3 shows an operating state of a rotary plate with the battery cover of FIG. 1 dismounted.

The packing 13 tightly shuts out fluid from the opening 15a of the camera body 15, and is inserted in a ditch (i.e. an undercut groove) 10a dug in the battery cover body 10. The packing 14 tightly shuts out fluid from the hole 10c bored on the battery cover body 10, and is fitted about a cylindrical portion 11a of the operating member 11 and rests against a shoulder 11c. Two locking projections 15b are formed on the camera body 15 and opposed mutually in the battery insertion opening 15a through which batteries 20 are loaded. The stoppage projections 15b, as shown In FIG. 3, project into spaces created between the outer circumferences of the batteries 20 and the inner circumference of the opening 15a. Notches 10b are formed on the battery cover body 10 to fit the projections 15b. A hemispheric projection 10d is formed on the battery cover body 10.

The rotary plate 12 is fixed to the operating member 11, which is fitted into the hole 10c of the battery cover body, using screws 16, whereby an assembled unit is formed. In addition to the contacts 12c and 12d, two locking chips 12a project from the outer circumference of the rotary plate 12 so as to engage with the projections 15b of the camera body. When the rotary plate 12 rotates and the locking chips 12a engage with the projections 15b, the battery cover 19 is mounted (i.e. locked) in the camera body with the projections 15b held tightly. The rotary plate 12 further includes a tongue 12b serving as a click member that is arranged at a position permitting the click stop of a projection 10d on the battery cover body 10 and deforms elastically at the time of the click stop.

Figure 4:
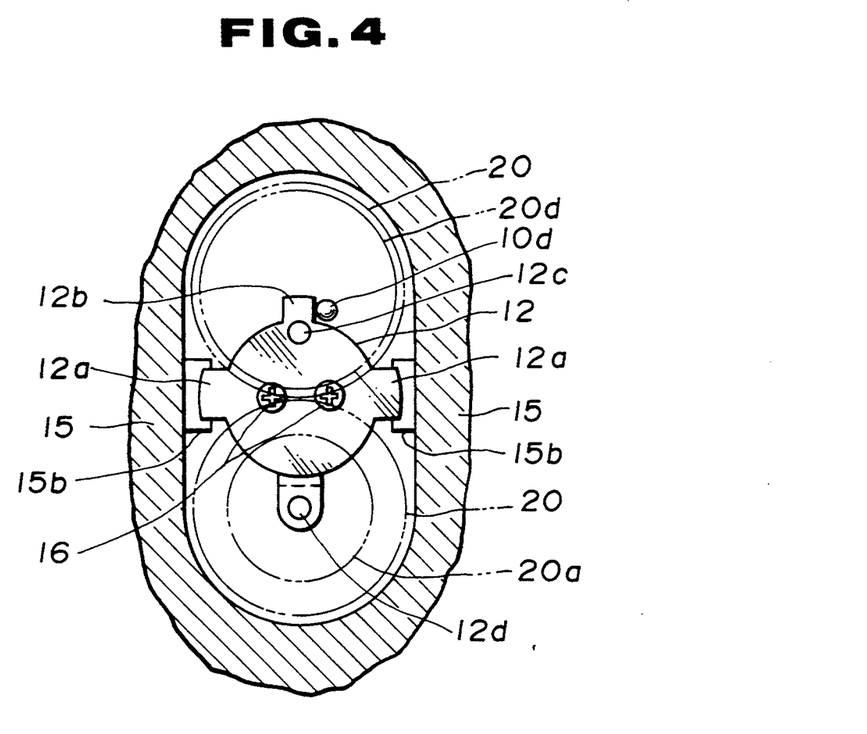
FIG. 4 shows an operating state of the rotary plate with the battery cover of FIG. 1 mounted.
Figure 5:
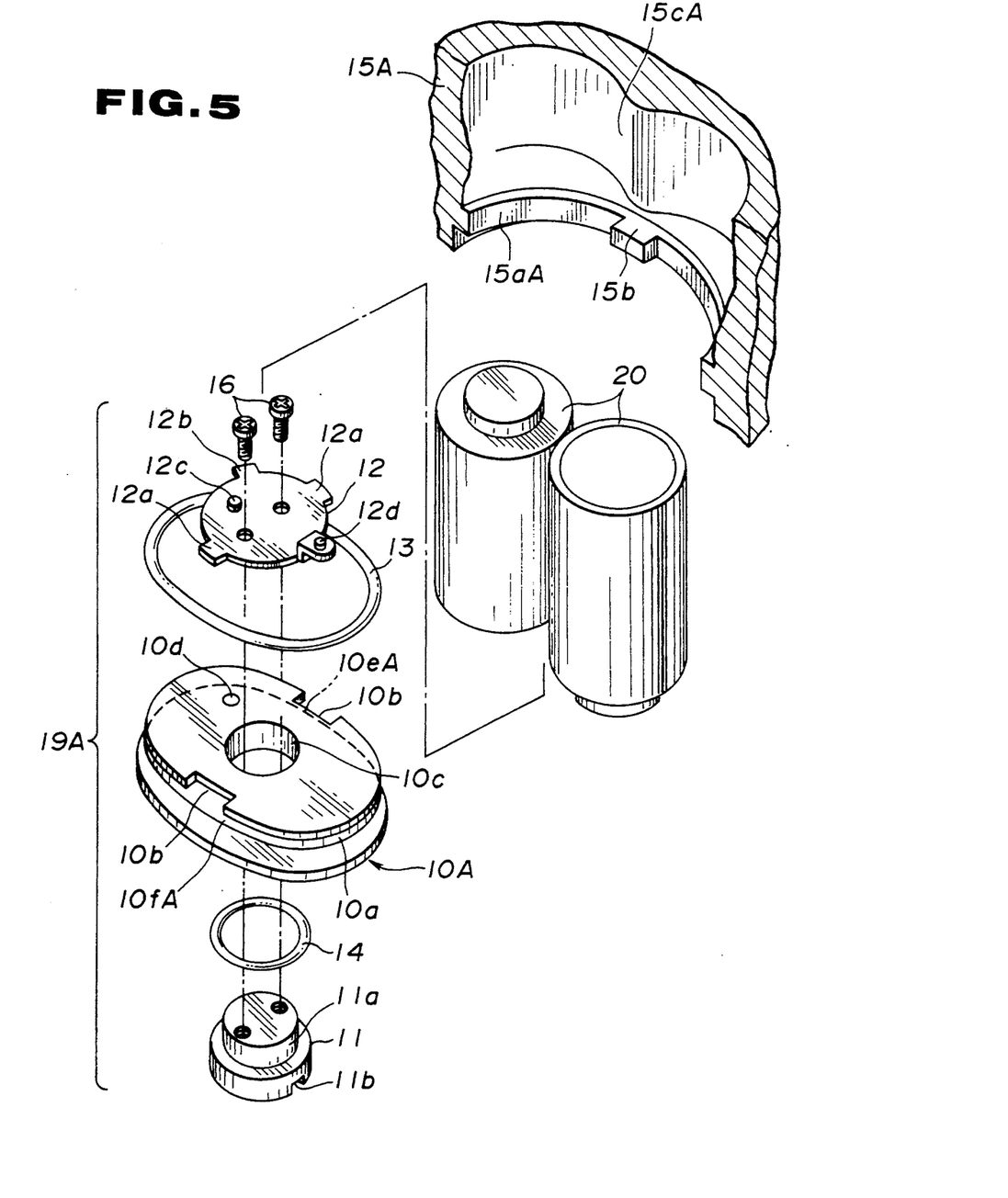
FIG. 5 is an exploded oblique view of a battery casing and a battery cover of a battery housing representing a variant of the embodiment shown in FIG. 1.
Figure 6:
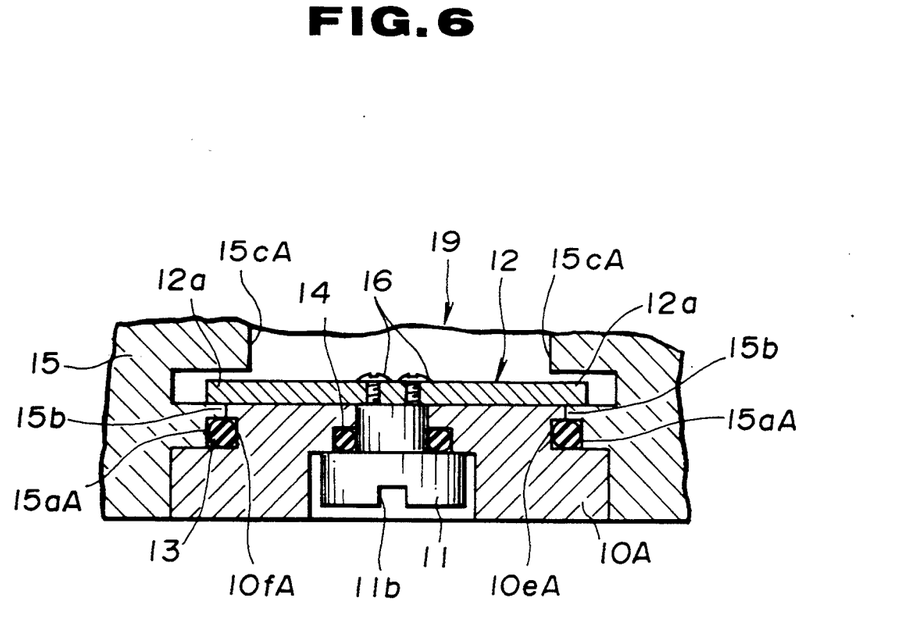
FIG. 6 is a longitudinal cross-sectional view of the battery housing of FIG. 5 in which the battery cover is mounted in the battery casing.
Figure 7:
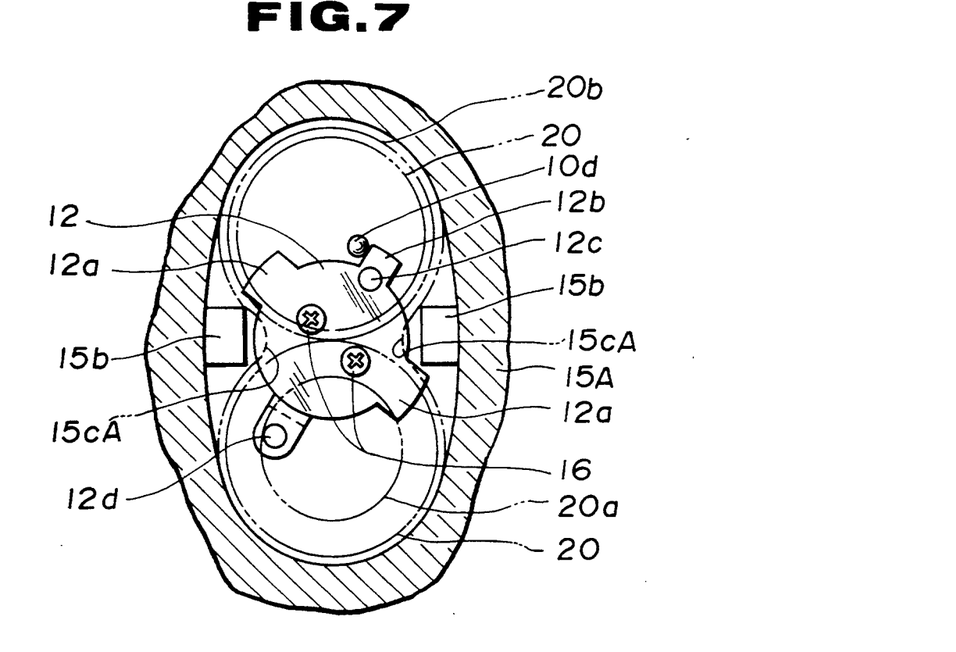
FIG. 7 shows an operating state of a rotary plate with the battery cover of FIG. 5 dismounted.
Figure 8:
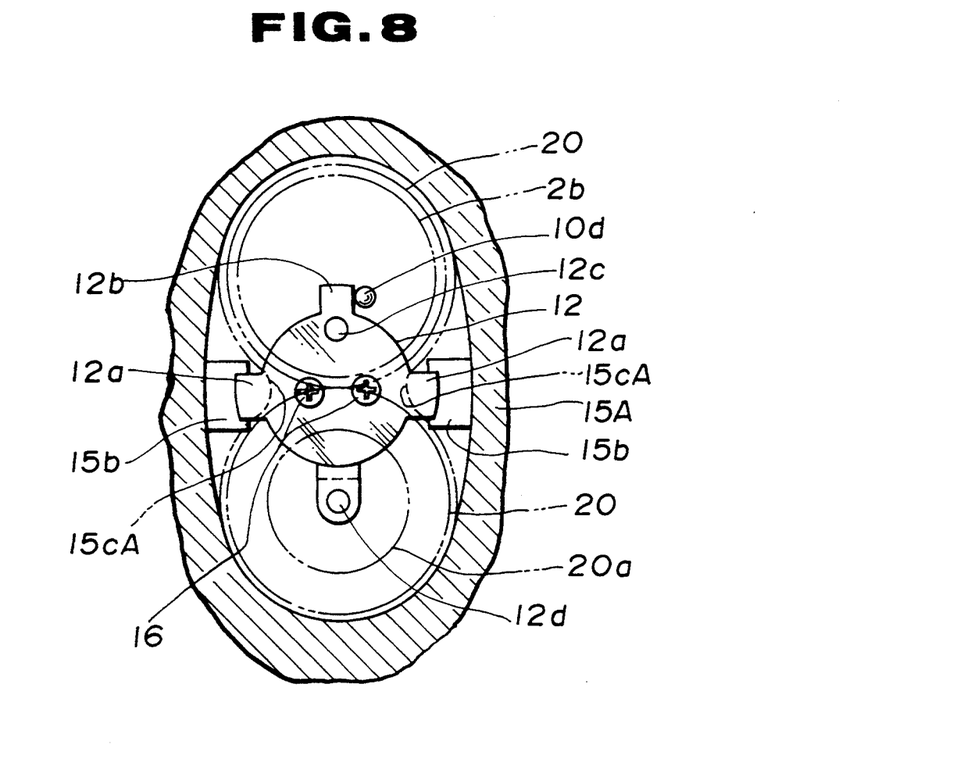
FIG. 8 shows an operating state of the rotary plate with the battery cover of FIG. 5 mounted.

As shown in FIGS. 3 and 4 showing the operation of the rotary plate 12, when the locking chips 12a of the rotary plate is dephased to disengage from the projections 15b of the camera body 15; that is, when the battery cover 19 is removed from the camera body 15, the tongue-like contact 12b of the rotary plate rests to the right of the projection 10d of the battery cover body. When the rotary plate 12 is rotated counterclockwise via the operating member 11 (See FIG. 3), the tongue 12b of the rotary plate slides over the projection 10d while deforming elastically, and then lies on the left of the projection 10d as shown in FIG. 4. In this state, the projections 15b of the camera body engage with the locking chips 12a of the rotary plate, and the battery cover 19 is mounted in the camera body 15. The rotary plate 12 is disabled to rotate counterclockwise from the position shown in FIG. 4 by means of a stopper mechanism which is not shown.

The rotation angle of the rotary plate 12 is specified so that the contacts 12c and 12d on the rotary plate 12 will come into contact with the electrodes 20a and 20b of the batteries 20 in the states shown in FIGS. 3 and 4. This is because once the contacts 12c and 12d part from the electrodes 20a and 20b, the contacts 12c and 12d themselves work as stoppers for the rotation of the rotary plate 12. However, if the sections of the rotary plate 12 supporting the contacts 12c and 12d have appropriate flexibility and the contacts 12c and 12d have appropriately inclined surfaces, the above restriction need not always be imposed on the rotary angle.

Mounting and dismounting the battery cover 19 having the aforesaid construction will be described.

When the battery cover 19 is dismounted from the camera body 15, the operating member 11 is rotated by turning a coin inserted in a slot 11b thereon, and positioned so that the locking chips 12a of the rotary plate will not engage with the projections 15b of the camera body as shown in FIG. 3. Then, the battery cover 19 is removed, and batteries are loaded in the camera body 15. Then, the battery cover body 10 is inserted into the opening 15a. Then, the operating member 11 is rotated, so that the tongue 12b will slide over the projection 10d against the clicking force and the locking chips 12a will engage with the projections 15b as shown in FIG. 4. Thus, the battery cover 19 is mounted in the camera body 15. In this case, since the rotary plate 12 holds the battery cover 19 in the mounted state by causing the projection 10d to click the tongue 12b, the battery cover 19 will not come off due to accidental rotation of the operating member 11.

Next, a variant of the battery housing of the aforesaid embodiment will be described in conjunction with FIGS. 5 to 8. Members identical to those in the previous embodiment will be assigned the same numerals. The description will be omitted.

In the housing of the aforesaid embodiment, the side lines 10e and 10f of the battery cover body 10 are substantially parallel with each other. When the waterproof packing 13 is attached to the cover body having this shape, stress working on the packing 13 differs between an arc portion of the body 10 and a straight portion thereof. The difference in stress degrades waterproofness. In a battery cover body 10A of a battery cover 19A in this variant, as shown in the exploded oblique view of FIG. 5, side margins 10eA and 10fA thereof are not straightened up but shaped like arcs having a large curvature. Thanks to the arc-shaped side margins, the stress working on the packing 13 becomes uniform. This contributes to improvement of waterproofness.

An opening 15aA of a battery housing 15A must be shaped in conformity with the battery cover body 10A. However, if the interior of the battery housing has the same shape, loaded batteries 20 will backlash. Therefore, in this variant, the inner portion of the battery housing beyond the opening is shaped as shown in FIGS. 5 to 8 to have ridge-like presser projections 15cA.

As described above, the battery cover 19 or 19A in the aforesaid embodiment or variant uses the rotary plate 12, which is a member for locking the battery cover in the camera body 15, as a connection chip for connecting batteries. Unlike a battery cover of a prior art, claw members dedicated for locking need not be installed separately, and the rotary plate 12 can be shaped simply. Furthermore, assembling work is effortless.

The aforesaid embodiment has been described as being applied to a waterproof camera. Needless to say, the present invention is not limited to a waterproof camera but can apply to a battery cover that is designed for a battery housing for a general compact electric apparatus and couples batteries electrically.

The clicking mechanism formed between the battery cover body 10 or 10A and the rotary plate 12 is not limited to the mechanism of the aforesaid embodiment. Alternatively, the tongue 12b may be replaced with a hole which is bored on the rotary plate 12 so as to fit and receive the projection 10d of the battery cover body 10. A dent may be dug in the battery cover body 10, and a hemispheric projection may be formed on the rotary plate 12 so as to fit into the dent. Anyhow, a battery housing of the present invention can be realized easily by arranging any type of clicking mechanism between the battery body 10 and the rotary plate 12.

What is claimed is:

1. A battery housing for a compact electric apparatus that includes a battery casing having a cavity for storing a plurality of batteries so that the batteries line up in side-by-side parallel fashion with an axis in the midst thereof, and a battery cover for shielding the battery casing, comprising:
    locking projections formed in a vicinity of a mounting opening of said battery casing and inside said cavity for mounting said battery cover;
    an operating member, part of which is exposed along an outer surface of said battery cover being arranged in said battery cover so as to be freely rotatable; and
    a rotary member arranged along an inner surface of said battery cover to rotate in unison with said operating member and located at a position facing batteries to be loaded inside said battery cover; and
    said rotary member including:
    engagement chips for selectively engaging shoulders of said locking projections when in said given angular position;
    a plurality of contacts each contacting at least one of a plurality of batteries to be loaded; and
    a clicking member for restricting rotation of the rotary member when in said given angular position.

2. A battery housing according to claim 1, wherein a waterproof packing is placed between said battery cover and said battery casing.

3. A battery housing according to claim 1, wherein a waterproof packing is placed between said battery cover and said operating member.

4. A battery housing according to claim 1, wherein the quantity of rotation of said rotary member is restricted to such an extent that when the rotary member lies in a given rotation range thereof, each of said contacts will always be in contact with at least one electrode of said batteries.

5. A battery housing according to claim 1, wherein said battery cover, and said battery casing for mounting said battery cover have smooth arc-shaped side margins.

6. A battery housing according to claim 1, wherein said contacts are arranged in such a manner that at least one contact will lie on each side of the rotary member so as to be offset from a center of rotation of said rotary member.

7. A battery housing for a compact electric apparatus that includes a battery casing having a cavity for storing a plurality of batteries so that the batteries will line up in side-by-side parallel fashion with an axis in the midst thereof, and a battery cover for shielding the battery casing, wherein:
    said battery casing includes locking projections in the vicinity of a mounting opening therein and in said cavity for mounting said battery cover; and
    said battery cover includes:
    an operating member, part of which is exposed to an outer side of said cover and that is arranged in said battery cover so as to be freely rotatable;
    notches in said cover each receiving one of said locking projections;
    a rotary member positioned to face batteries loaded in said casing;
    engagement chips for engaging shoulders of said locking projections being integrally formed on said rotary member;
    a plurality of contacts on said rotary member for engaging electrodes of a plurality of batteries in said casing being formed on said rotary member; and
    a means for uniting said operating member and said rotary member.

8. A battery cover to be mounted in a battery housing for storing a plurality of batteries so that the batteries will line up in side-by-side parallel fashion with an axis in the midst thereof, comprising:
    a rotary member having locking means for selectively engaging a shoulder in said battery housing for retaining a state in which said battery cover is mounted in said battery housing, and further having connecting means for coupling batteries; and accessible from an exterior of said battery housing;
    an operating means for rotating said rotary member; and
    means for restricting the quantity of rotation of said rotary member to such an extent that when said rotary member lies in a given rotation range thereof, each of said connecting means will always be in contact with at least one electrode of said batteries.

9. A battery cover according to claim 8, wherein said means for restricting the quantity of rotation of said rotary member comprises a projection on said rotary member and a cooperating projection on said battery cover for engaging the projection on said rotary member to limit rotation thereof.

10. A battery cover to be mounted in a battery housing having a cavity for storing a plurality of batteries so that the batteries will line up in side-by-side parallel fashion with an axis in the midst thereof, wherein:
    locking means for retaining a state in which said battery cover is mounted in said battery housing, and connecting means for coupling batteries each being formed on a rotary member; and means for restricting a quantity of rotation of said rotary member to such an extent that when said rotary member lies within a given rotation range thereof, each of contacts will always be in contact with at least one electrode of said batteries.

11. A battery housing for a waterproof camera, comprising:

a battery casing in which two cylindrical-shaped batteries are inserted in a direction of an axis in a midst of the batteries so as to line up in side-by-side fashion in parallel with said axis, said casing having a substantially elliptical-shaped opening;

a substantially elliptical-shaped battery cover that shields said opening so as to be opened or closed freely, and has a continuous groove extending over the outer circumference thereof;

a waterproof elastic ring arranged in said continuous groove; and a locking member mounted in a region of said battery cover corresponding to a middle position of said two batteries so as to be freely rotatable, and enables retention of a state in which said battery cover is mounted in said battery casing and a state permitting dismounting of said battery cover; and said locking member including two contacts that each come into contact with at least one electrode of an associated one of said two batteries.

12. A battery housing according to claim 11, wherein said battery casing and battery cover are shaped like a swelling-out-ellipse throughout the outer circumferences thereof in the region of the sides of the ellipse having a larger radius of curvation.

13. A battery housing according to claim 11, wherein said locking member is made of a conducting material.

14. A battery housing according to claim 11, wherein when said locking member lies in a given rotation range thereof, said two contacts are each always in contact with at least one electrode of an associated one of said batteries.

15. A battery housing for a waterproof camera, comprising:

a battery casing in which two cylindrical-shaped batteries are inserted in a direction of an axis between the batteries so as to line up in side-by-side fashion in parallel with said axis, and that has a substantially elliptical-shaped opening for inserting and removing batteries;

an elliptical-shaped battery cover that shields said opening so as to be opened or closed freely and has a continuous seating groove over an outer circumference thereof;

a waterproof elastic ring seated in said continuous seating groove;

a first locking member mounted in a region of said battery cover corresponding to a middle position of the two batteries so as to be freely rotatable, and enables a retention of a state in which said battery cover is mounted in said battery casing and a state for the dismounting of said battery cover; and said casing having a second locking member that, when said first locking member rotates in one direction, engages with said first locking member, and that, when said first locking member rotates in an opposite direction, disengages from said first locking member; and said first locking member being made of a conducting material and including contacts that come into contact with electrodes of said batteries.

16. A battery housing according to claim 15, wherein said second locking member projects inward from an elliptical-shaped region of an elliptical-shaped opening of said battery casings, said region lying between ends of the elliptical-shaped opening of a smaller radius of curvature.

17. A battery housing for storing a plurality of batteries so that the batteries line up in parallel fashion with an axis in the midst thereof, comprising:

a battery casing having a cavity for storing batteries; and a battery cover for shielding an opening in said battery casing;

said battery cover including:

an operating means freely rotatable on said cover and accessible from an exterior of the casing;

a rotatable connecting means facing said batteries and united with said operating means and having a conductive contact surface which is always in contact with electrodes of said plurality of batteries regardless of an angular position thereof; and a locking member for locking said battery cover in said opening when said operating means is rotated to a given position.

18. A battery cover for a battery casing for use in a camera having a battery casing for storing a plurality of batteries so that batteries in the casing will line up in parallel with an axis therebetween, comprising:

an operating means freely rotatable on said cover and accessible from an exterior of the casing;

a rotatable connecting means facing said batteries and united with said operating means and in continuous contact with electrodes of said plurality of batteries regardless of an angular position thereof; and a locking member for locking said operating means in said opening when rotated to a closed position.

* * * * *